US012574480B2

(12) United States Patent
Saito

(10) Patent No.: US 12,574,480 B2
(45) Date of Patent: Mar. 10, 2026

(54) SURGICAL OPERATION ROOM SYSTEM, IMAGE RECORDING METHOD, PROGRAM, AND MEDICAL INFORMATION PROCESSING SYSTEM

(71) Applicant: Sony Group Corporation, Tokyo (JP)

(72) Inventor: Shigeru Saito, Tokyo (JP)

(73) Assignee: Sony Group Corporation, Tokyo (JP)

( * ) Notice: Subject to any disclaimer, the term of this patent is extended or adjusted under 35 U.S.C. 154(b) by 50 days.

(21) Appl. No.: 18/549,924

(22) PCT Filed: Jan. 20, 2022

(86) PCT No.: PCT/JP2022/001915
§ 371 (c)(1),
(2) Date: Sep. 11, 2023

(87) PCT Pub. No.: WO2022/201800
PCT Pub. Date: Sep. 29, 2022

(65) Prior Publication Data
US 2024/0155085 A1 May 9, 2024

(30) Foreign Application Priority Data
Mar. 25, 2021 (JP) ................................ 2021-051579

(51) Int. Cl.
*H04N 7/18* (2006.01)
*H04N 5/77* (2006.01)
*H04N 23/61* (2023.01)
*H04N 23/66* (2023.01)

(52) U.S. Cl.
CPC .............. *H04N 7/188* (2013.01); *H04N 5/77* (2013.01); *H04N 23/61* (2023.01); *H04N 23/66* (2023.01)

(58) Field of Classification Search
None
See application file for complete search history.

(56) References Cited

U.S. PATENT DOCUMENTS

| | | | | |
|---|---|---|---|---|
| 2015/0092052 A1* | 4/2015 | Shin | ....................... | H04N 7/183 |
| | | | | 348/143 |
| 2018/0092509 A1 | 4/2018 | Yamaki | | |
| 2018/0271613 A1* | 9/2018 | Ito | ........................ | H04N 21/436 |

(Continued)

FOREIGN PATENT DOCUMENTS

| | | | |
|---|---|---|---|
| CN | 104966450 | * | 10/2015 |
| CN | 107944400 | * | 4/2018 |

(Continued)

OTHER PUBLICATIONS

International Search Report and Written Opinion mailed on Apr. 5, 2022, received for PCT Application PCT/JP2022/001915, filed on Jan. 20, 2022, 9 pages including English Translation.

*Primary Examiner* — Eileen M Adams
(74) *Attorney, Agent, or Firm* — XSENSUS LLP

(57) ABSTRACT

The present disclosure relates to a surgical operation room system, an image recording method, a program, and a medical information processing system that allow records to be kept in an appropriate manner.

A setting unit sets whether or not to enable, for each of a plurality of input sources that inputs an image, automatic recording of the image, the plurality of input sources being provided in a surgical operation room. The present disclosure is applicable to a surgical operation room system.

18 Claims, 12 Drawing Sheets

(56)             References Cited

U.S. PATENT DOCUMENTS

| | | | |
|---|---|---|---|
| 2019/0110218 A1 | 4/2019 | Moon | |
| 2021/0145519 A1* | 5/2021 | Mosnier | A61B 34/20 |
| 2021/0275000 A1* | 9/2021 | Ramesh | A61B 1/045 |
| 2021/0314522 A1* | 10/2021 | Okusawa | A61B 1/0655 |
| 2022/0233272 A1* | 7/2022 | Landfors | G16H 30/20 |

FOREIGN PATENT DOCUMENTS

| | | | |
|---|---|---|---|
| JP | 2005-135344 A | 5/2005 | |
| JP | 2007-257122 A | 10/2007 | |
| JP | 2009233042 A | 10/2009 | |
| JP | 2010021761 A | 1/2010 | |
| JP | 2014-104365 A | 6/2014 | |
| JP | 2017192043 A | 10/2017 | |
| JP | 6697622 B1 | 5/2020 | |
| WO | WO-2006077797 A1 | 7/2006 | |
| WO | 2016/190022 A1 | 12/2016 | |
| WO | WO-2018149176 A1 | 8/2018 | |
| WO | WO-2020110218 A1 | 6/2020 | |

* cited by examiner

Figure 5:
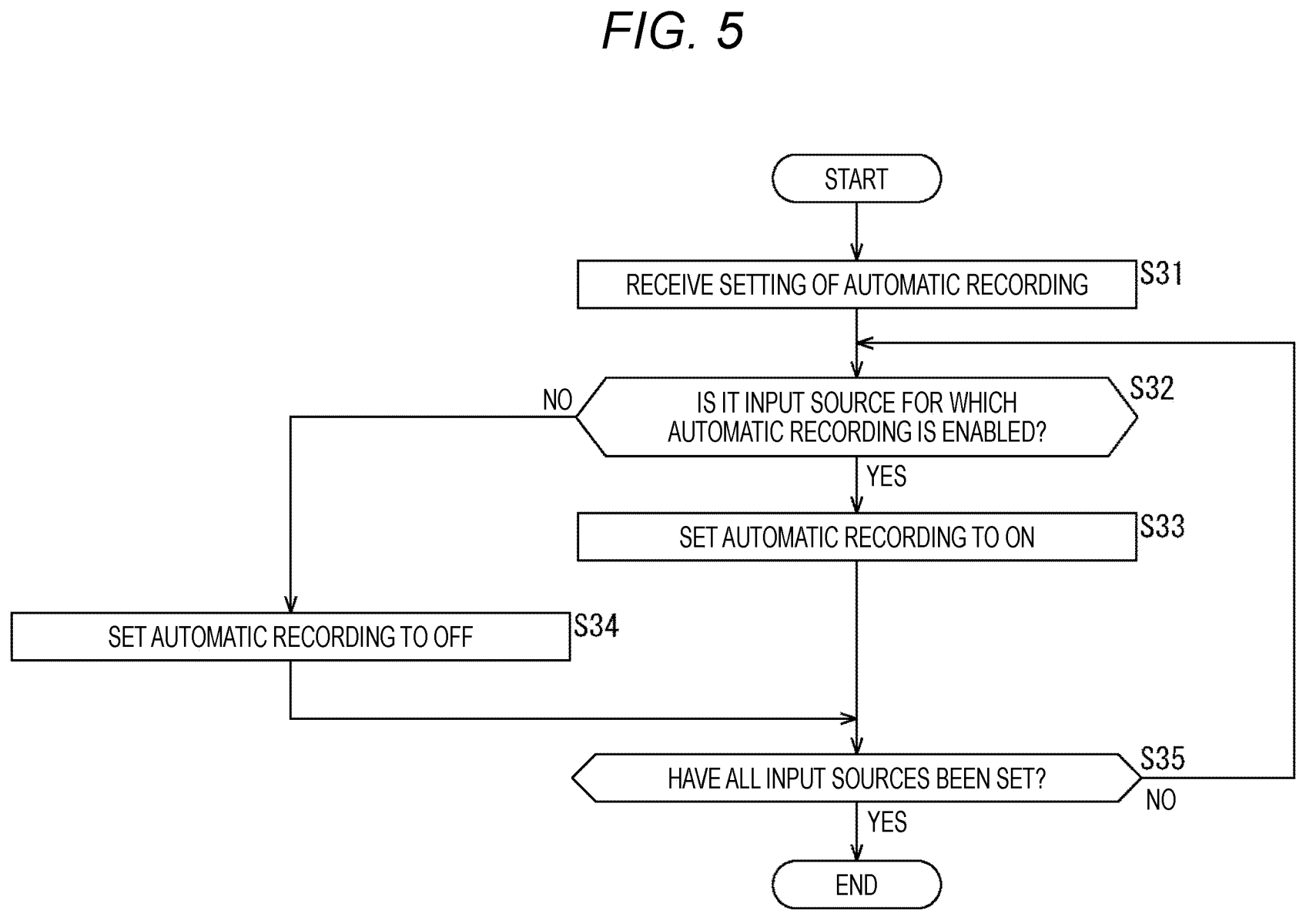

START

S31 — RECEIVE SETTING OF AUTOMATIC RECORDING

S32 — IS IT INPUT SOURCE FOR WHICH AUTOMATIC RECORDING IS ENABLED?

YES → S33 — SET AUTOMATIC RECORDING TO ON

NO → S34 — SET AUTOMATIC RECORDING TO OFF

S35 — HAVE ALL INPUT SOURCES BEEN SET?

NO

YES

END

*FIG. 6*

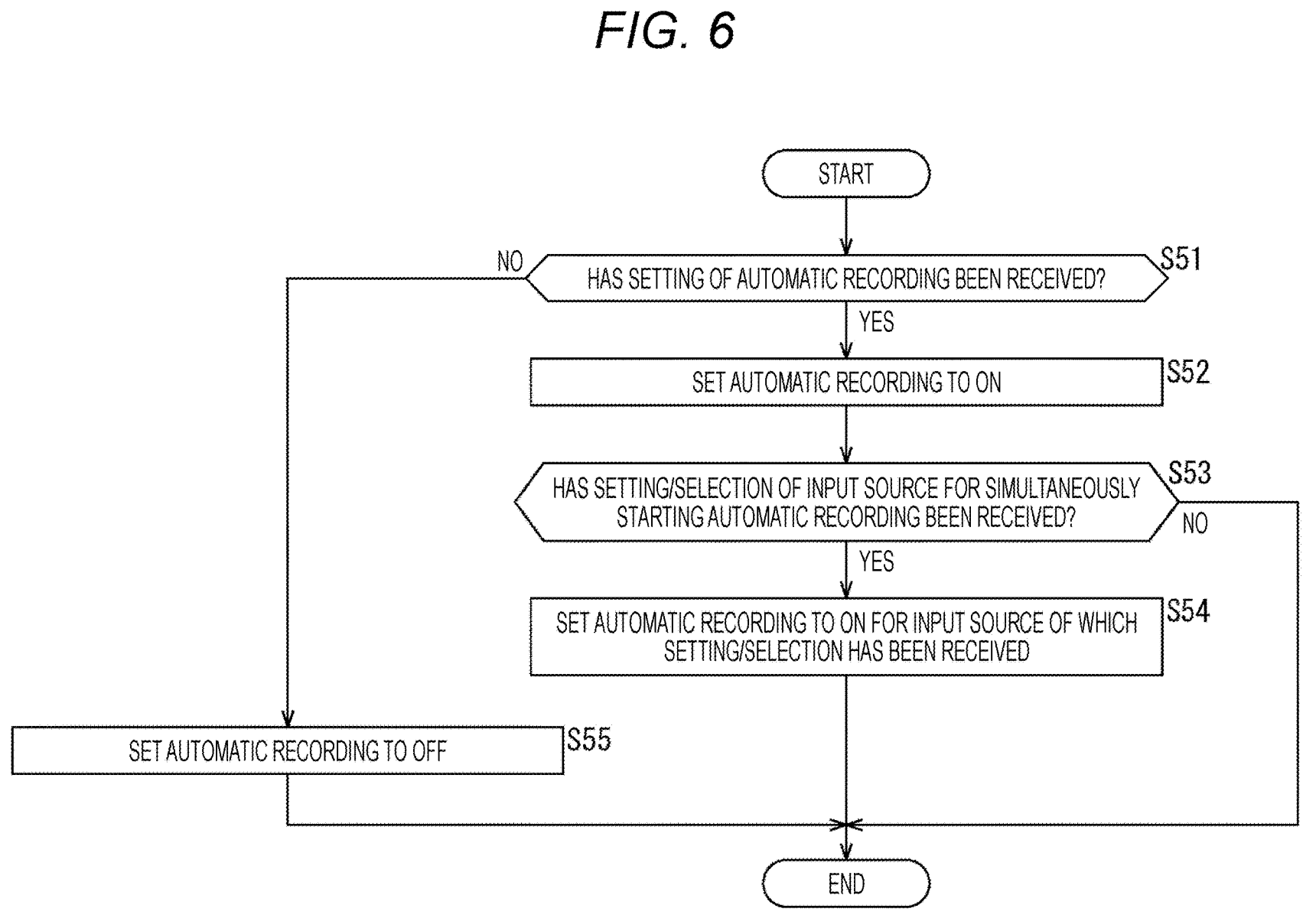

START

S51 — HAS SETTING OF AUTOMATIC RECORDING BEEN RECEIVED?

YES → S52 — SET AUTOMATIC RECORDING TO ON

S53 — HAS SETTING/SELECTION OF INPUT SOURCE FOR SIMULTANEOUSLY STARTING AUTOMATIC RECORDING BEEN RECEIVED?

YES → S54 — SET AUTOMATIC RECORDING TO ON FOR INPUT SOURCE OF WHICH SETTING/SELECTION HAS BEEN RECEIVED

NO

END

S55 — SET AUTOMATIC RECORDING TO OFF

FIG. 10

Monitor 1

Monitor 2

SURGICAL OPERATION ROOM SYSTEM, IMAGE RECORDING METHOD, PROGRAM, AND MEDICAL INFORMATION PROCESSING SYSTEM

TECHNICAL FIELD

The present disclosure relates to a surgical operation room system, an image recording method, a program, and a medical information processing system, and particularly relates to a surgical operation room system, an image recording method, a program, and a medical information processing system that allow records to be kept in an appropriate manner.

BACKGROUND ART

A surgical operation room or an intensive care unit (ICU) is provided with not only various medical instruments, but also a plurality of input sources that inputs images such as a magnetic resonance imaging (MRI) device, a computed tomography (CT) device, and an ultrasound device.

Recently, an increase in efficiency of surgery using a surgical operation room system that collectively controls such input sources and displays an image has been made. Such a surgical operation room system is also required to have a function of recording images.

For example, Patent Document 1 discloses a system that transmits an image captured by a surgical loupe in a surgical operation room to an external device to record the image.

CITATION LIST

Patent Document

Patent Document 1: Japanese Patent Application Laid-Open No. 2014-104365

SUMMARY OF THE INVENTION

Problems to be Solved by the Invention

Usually, recording start timing, a recording time, and the like of a surgical image to be a surgical record are determined by a surgical staff member. During surgery, the surgical staff member, however, is busy with work, and thus may not be able to perform recording at appropriate timing. On the other hand, when the surgical image is recorded from the beginning to the end, there is a possibility that a recording volume becomes extremely large. Not only a surgical operation room but also a medical or nursing field may face such problems.

The present disclosure has been made in view of such circumstances, and it is therefore an object of the present disclosure to allow records to be kept in an appropriate manner.

Solutions to Problems

A surgical operation room system according to a first aspect of the present disclosure includes a setting unit configured to set whether or not to enable, for each of a plurality of input sources that inputs an image, automatic recording of the image, the plurality of input sources being provided in a surgical operation room.

An image recording method according to the first aspect of the present disclosure includes causing a surgical operation room system to set whether or not to enable, for each of a plurality of input sources that inputs an image, automatic recording of the image, the plurality of input sources being provided in a surgical operation room.

A program according to the first aspect of the present disclosure causes a computer to perform processing of setting whether or not to enable, for each of a plurality of input sources that inputs an image, automatic recording of the image, the plurality of input sources being provided in a surgical operation room.

A medical information processing system according to a second aspect of the present disclosure includes a setting unit configured to set whether or not to enable, for each of a plurality of video sources that outputs information regarding a patient, automatic recording of the information.

According to the first aspect of the present disclosure, whether or not to enable, for each of the plurality of input sources that inputs an image, the automatic recording of the image is set, the plurality of input sources being provided in the surgical operation room.

According to the second aspect of the present disclosure, whether or not to enable, for each of the plurality of video sources that outputs information regarding a patient, the automatic recording of the information is set.

BRIEF DESCRIPTION OF DRAWINGS

FIG. 1 is a diagram depicting an outline of a surgical operation room system to which the technology according to the present disclosure can be applied.

FIG. 2 is a block diagram depicting a functional configuration example of the surgical operation room system.

FIG. 3 is a diagram depicting an example of a setting screen.

FIG. 5 is a flowchart for describing a flow of automatic recording setting processing.

FIG. 6 is a flowchart for describing a flow of automatic recording setting processing.

FIG. 10 is a diagram depicting an example of an integration screen.

FIG. 11 is a diagram depicting an example of a preview screen.

FIG. 12 is a diagram depicting a configuration example of a computer.

MODE FOR CARRYING OUT THE INVENTION

Figure 4:
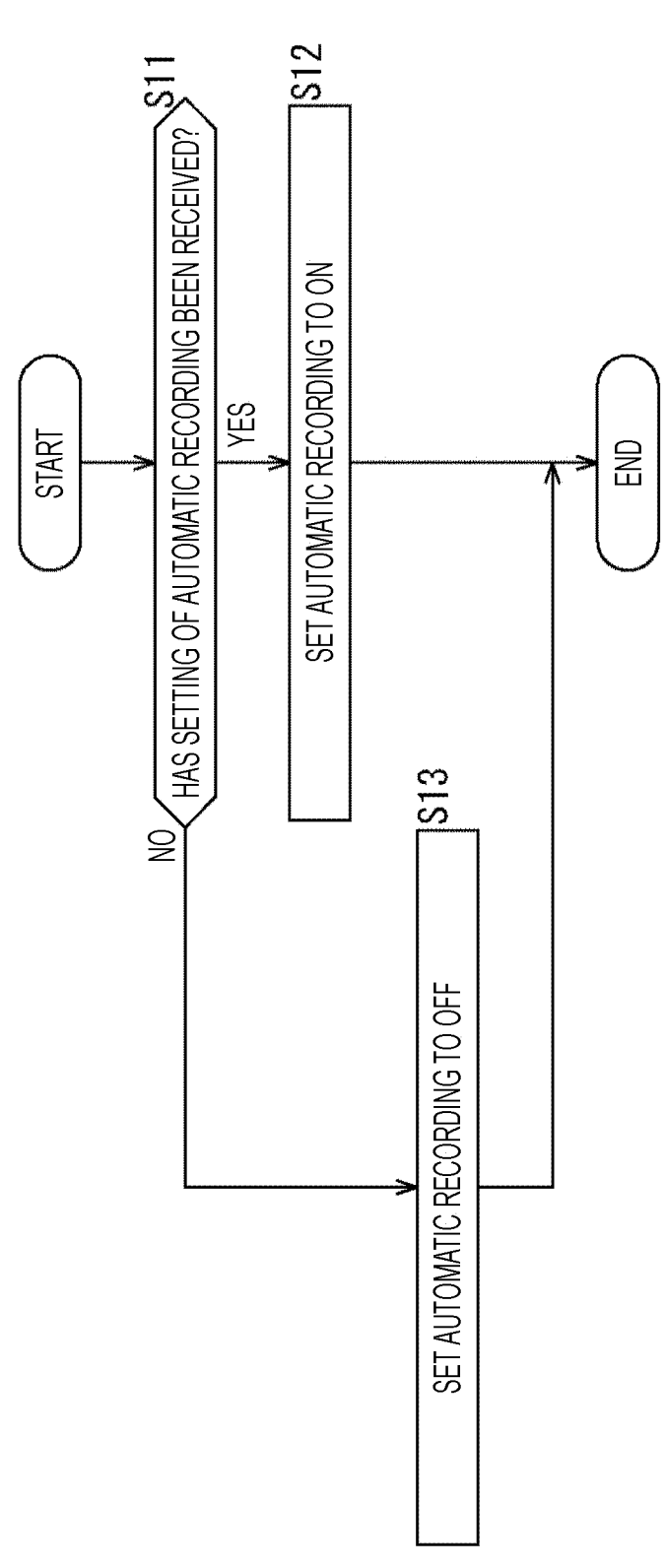
FIG. 4 is a flowchart for describing a flow of automatic recording setting processing.

A mode for carrying out the present disclosure (hereinafter, referred to as an embodiment) will be described below. Note that the description will be given in the following order.

1. Outline of Surgical Operation Room System
2. Technical Background and Functional Configuration Example of Surgical Operation Room System
3. Automatic Recording Setting Processing
4. Recording Processing for Each Input Source
5. Other Automatic Recording Function
6. Modification Example
7. Configuration Example of Computer

<1. Outline of Surgical Operation Room System>

Figure 1:
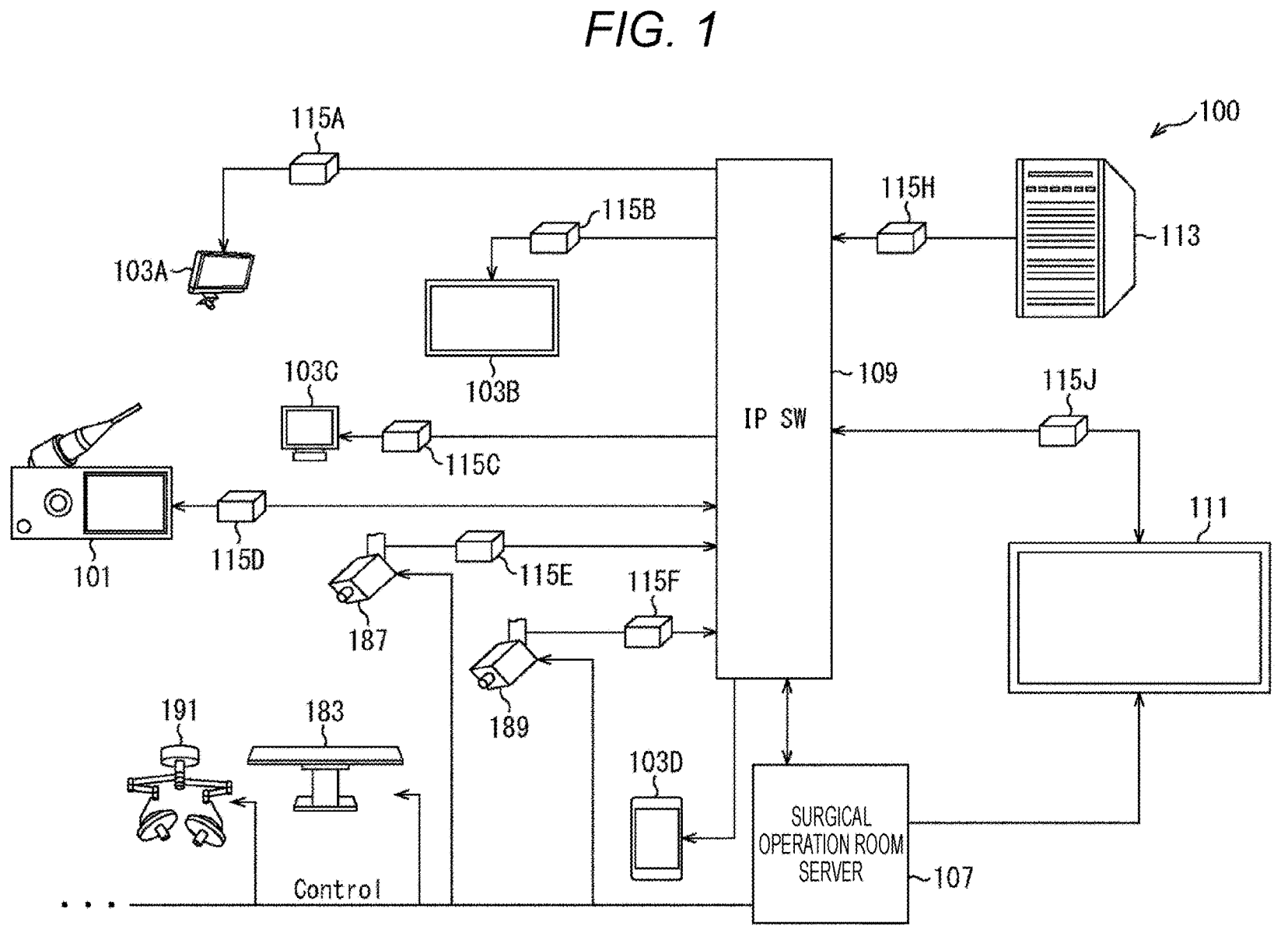

FIG. 1 is a diagram depicting an outline of a surgical operation room system 100 to which the technology according to the present disclosure can be applied.

In the surgical operation room system 100 depicted in FIG. 1, a device group installed in a surgical operation room is connected to a surgical operation room server 107 via an IP switch (SW) 109 so as to be able to cooperate with each other. The surgical operation room system 100 includes an Internet protocol (IP) network capable of transmitting and receiving 4K/8K images, and input and output images and control information directed to each instrument are transmitted and received over the IP network.

In the surgical operation room, various devices can be installed.

In the example in FIG. 1, a device group 101 including various devices used for endoscopic surgery, a ceiling camera 187 that captures an image of the hands of an operator, a surgical field camera 189 that captures an image of how the entire surgical operation room is, a plurality of display devices 103A to 103D, a patient bed 183, and a light 191 are depicted. Both the ceiling camera 187 and the surgical field camera 189 are provided on the ceiling of the surgical operation room. In addition to the illustrated endoscope, various medical instruments that acquire images, such as a master-slave endoscopic surgical robot and an X-ray imaging device, may be applied to the device group 101.

The display devices 103A to 103C, the device group 101, the ceiling camera 187, and the surgical field camera 189 are connected to the IP SW 109 via IP converters 115A to 115F, respectively. Hereinafter, the IP converters 115A to 115F and the like are simply referred to as an IP converter 115, unless otherwise distinguished from each other.

The IP converters 115D, 115E, and 115F belonging to an input source side (camera side) that inputs an image each perform IP conversion on an image from a corresponding medical imaging device (endoscope, surgical microscope, X-ray imaging device, surgical field camera, pathological imaging device, or the like) and transmit the converted image over a network. The IP converters 115A to 115C belonging to an image output side (monitor side) that outputs an image each convert the image transmitted over the network into a format specific to a corresponding monitor and output the converted image. The IP converter 115 belonging to the input source side functions as an encoder, and the IP converter 115 belonging to the image output side functions as a decoder. The input source includes, for example, a video source.

The IP converter 115 can have various image processing functions. For example, the IP converter 115 can have a function of performing resolution conversion processing according to an output destination, a function of performing rotation correction and camera shake correction on an endoscopic image, a function of performing object recognition processing, and the like.

Such image processing functions may be unique to a connected medical imaging device or may be upgraded from the outside. The IP converter 115 belonging to the image output side (monitor side) can also perform processing such as composition of a plurality of images (PinP processing or the like) and superimposition of annotation information.

The protocol conversion function of the IP converter 115 is a function of converting a received signal into a converted signal that conforms to a communication protocol so as to be able to be communicated over a network such as the Internet. Any desired communication protocol may be set as the communication protocol. Furthermore, the protocolconvertible signal received by the IP converter 115 is a digital signal such as an image signal or a pixel signal. The IP converter 115 may be incorporated into a device belonging to the input source side or a device belonging to the image output side.

The device group 101 belongs to, for example, an endoscopic surgery system, and includes an endoscope, a display device that displays an image captured by the endoscope, and the like. On the other hand, the display devices 103A to 103D, the patient bed 183, and the light 191 are devices provided in the surgical operation room separately from the endoscopic surgery system. Such instruments used for surgery or diagnosis are each also referred to as a medical instrument. The surgical operation room server 107 and/or the IP SW 109 cooperatively control how the medical instruments operate. Furthermore, in a case where medical image acquisition devices such as a surgical robot (surgical master-slave) system and an X-ray imaging device are present in the surgical operation room, such instruments are also connectable as the device group 101.

The surgical operation room server 107 centrally controls processing related to image display in the medical instruments.

Specifically, among the devices included in the surgical operation room system 100, the device group 101, the ceiling camera 187, and the surgical field camera 189 may be devices (hereinafter, also referred to as source devices) that have a function of transmitting information to be displayed during surgery (hereinafter, also referred to as display information). Furthermore, the display devices 103A to 103D may be devices (hereinafter, also referred to as output destination devices) that output the display information.

The surgical operation room server 107 has a function of controlling how the source devices and the output destination devices operate, obtaining the display information from the source devices, transmitting the display information to the output destination devices, and allowing the output destination devices to display or record the display information. Note that the display information includes various images captured during surgery, various information regarding the surgery (for example, physical information of a patient, information regarding past examination results and surgical procedures, and the like), and the like.

Specifically, the device group 101 may transmit information regarding an image of an operative site in the body cavity of the patient captured by the endoscope to the surgical operation room server 107 as the display information. Furthermore, the ceiling camera 187 may transmit information regarding an image of the hands of the operator captured by the ceiling camera 187 to the surgical operation room server 107 as the display information. Furthermore, the surgical field camera 189 may transmit information regarding an image showing how the entire surgical operation room is captured by the surgical field camera 189 to the surgical operation room server 107 as the display information. In a case where the surgical operation room system 100 includes other devices having an imaging function, the surgical operation room server 107 may acquire information regarding images captured by the other devices as the display information from the other devices.

The surgical operation room server 107 causes at least any one of the display devices 103A to 103D, which are output destination devices, to display the acquired display information (in other words, an image captured during surgery and various types of information regarding the surgery). In the example in FIG. 1, the display device 103A is a display device installed on the ceiling of the surgical operation room in a suspended manner, and the display device 103B is a display device installed on a wall surface of the surgical operation room. The display device 103C is a display device installed on a desk in the surgical operation room, and the display device 103D is a mobile device (for example, a tablet personal computer (PC) or a smartphone) having a display function.

The IP SW 109 is configured as one input-output controller that controls input/output of the image signal to/from a connected instrument. For example, the IP SW 109 controls input/output of the image signal under the control of the surgical operation room server 107. The IP SW 109 controls high-speed transfer of the image signal between devices located on the IP network.

The surgical operation room system 100 may include a device located outside the surgical operation room. The device located outside the surgical operation room may be, for example, a server connected to a network constructed inside or outside a hospital, a PC used by a medical staff member, a projector installed in a conference room of the hospital, or the like. In a case where such an external device is present outside the hospital, the surgical operation room server 107 can also cause a display device of another hospital to display the display information, via a video conference system or the like, for telemedicine.

An external server 113 is, for example, an in-hospital server or a cloud server located outside the surgical operation room, and may be used for image analysis, data analysis, or the like. In this case, the information regarding the image of the surgical operation room may be transmitted to the external server 113, and additional information may be generated as a result of big data analysis or recognition/analysis processing using AI (machine learning) by the external server 113 and fed back to the display device in the surgical operation room. At this time, the IP converter 115H connected to the IP SW 109 in the surgical operation room transmits data to the external server 113 for image analysis. The data to be transmitted may be a surgical image itself captured by the endoscope or the like, metadata extracted from the image, data indicating an operation status of a connected instrument, or the like.

The surgical operation room system 100 is provided with a centralized operation panel 111. A user can give an instruction on input/output control of the IP SW 109 and an instruction on operation of a connected instrument to the surgical operation room server 107 via the centralized operation panel 111. Furthermore, the user can switch image displays via the centralized operation panel 111. The centralized operation panel 111 is configured as a touch panel provided on a display surface of the display device. The centralized operation panel 111 and the IP SW 109 are connected via an IP converter 115J.

In the surgical operation room system 100, the IP network may be configured as a wired network, or a part or all of the IP network may be configured as a wireless network. For example, the IP converter 115 belonging to the input source side having a wireless communication function may transmit a received image to the IP converter 115 belonging to the image output side over a wireless communication network such as a fifth generation mobile communication system (5G) or a sixth generation mobile communication system (6G).

<2. Technical Background and Functional Configuration Example of Surgical Operation Room System>
(Background of Technology According to Present Disclosure)

As described above, the surgical operation room is provided with a plurality of input sources that inputs images (that generates images and supplying the images to another device), such as various medical instruments, an MRI device, and a CT device.

Recently, an increase in efficiency of surgery using a surgical operation room system that collectively controls such input sources and displays an image has been made. Such a surgical operation room system is also required to have a function of recording images.

Usually, recording start timing, a recording time, and the like of a surgical image to be a surgical record are determined by a surgical staff member. The surgical staff member here includes an operator, an assistant, a nurse, a clinical engineer, and the like.

During surgery, the surgical staff member, however, is busy with work, and thus may not be able to perform recording at appropriate timing. Furthermore, for an unexpected event such as bleeding, even if recording is started after the occurrence of the event, a desired surgical image cannot be recorded. On the other hand, when the surgical image is recorded from the beginning to the end, there is a possibility that a recording volume becomes extremely large.

Therefore, in the surgical operation room system 100 to which the technology according to the present disclosure is applied, whether or not to enable automatic image recording is determined for each of the plurality of input sources. The plurality of input sources includes the above-described device group 101, the ceiling camera 187, the surgical field camera 189, an MRI device and a CT device that captures an MRI image and a CT image before surgery, and the like.

The automatic recording herein includes pre-recording in which image recording starts from a predetermined time (for example, 30 seconds) before a recording start instruction, and trigger recording in which recording starts with a recognition result of image recognition performed on an image as a trigger.

Furthermore, the automatic recording may be a trigger recording that is triggered by input from an electronic medical instrument or triggered by input from a device located outside the surgical operation room system 100. The input from the device located outside the surgical operation room system 100 is, for example, a signal that is transmitted from an integrated system to the surgical operation room system 100 in accordance with a surgery start setting made on the integrated system by the surgical staff member.
(Functional Configuration Example of Surgical Operation Room System)

Figure 2:
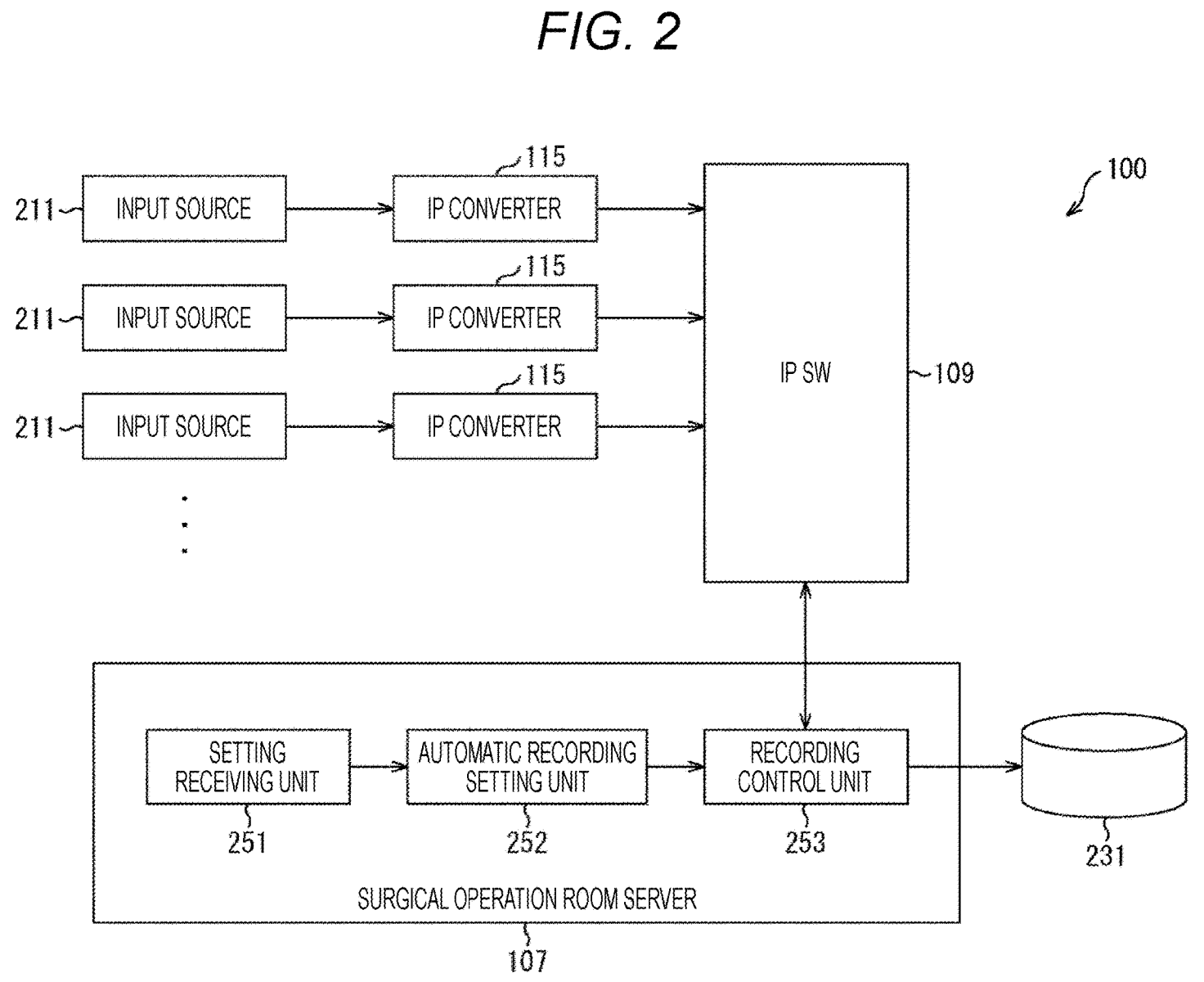

FIG. 2 is a block diagram depicting a functional configuration example of the surgical operation room system 100 that makes a setting as to whether or not to enable the automatic image recording for each of the plurality of input sources installed in the surgical operation room. Note that, In FIG. 2, the same components as in FIG. 1 are denoted by the same reference numerals.

In the surgical operation room system 100 in FIG. 2, each of a plurality of input sources 211 is connected to the IP switch 109 via the IP converter 115. The plurality of input sources 211 corresponds to instruments that input images to the IP switch 109, such as an MRI device and a CT device, in addition to the device group 101, the ceiling camera 187, and the surgical field camera 189 in FIG. 1.

The image input from the input source 211 to the IP switch 109 is recorded in a recording unit 231 under the control of the surgical operation room server 107.

The recording unit 231 may be a recording device such as a hard disk drive (HDD) or a solid state drive (SSD) built in the surgical operation room server 107, or may be a recording medium connected to the surgical operation room server 107 via a driver. Furthermore, the recording unit 231 may be a recording device provided outside the surgical operation room and connected to the surgical operation room server 107 over an in-hospital network, the cloud server located outside the hospital, or the like.

The surgical operation room server 107 controls recording of the image input from the input source 211 to the IP switch 109 in the recording unit 231, and sets whether or not to enable the automatic image recording for each input source 211.

The surgical operation room server 107 includes a setting receiving unit 251, an automatic recording setting unit 252, and a recording control unit 253.

The setting receiving unit 251 receives the setting as to whether or not to enable the automatic recording (ON/OFF of the automatic recording) for each input source 211 on the basis of an operation of the surgical staff member on a setting screen to be described later. Reception information indicating details of the setting thus received is supplied to the automatic recording setting unit 252.

The automatic recording setting unit 252 sets the automatic recording to ON/OFF for each input source 211 on the basis of the reception information from the setting receiving unit 251. Setting information indicating ON/OFF of the automatic recording thus set is supplied to the recording control unit 253.

Furthermore, the automatic recording setting unit 252 may not only set the automatic recording to ON/OFF for each input source 211 but also set an automatic recording method for each input source 211. For example, the automatic recording setting unit 252 may set, for each input source 211, which of the pre-recording, the trigger recording that is triggered by the recognition result of image recognition, and trigger recording that is triggered by the input from the electronic medical instrument is enabled as the automatic recording.

The recording control unit 253 controls recording for each input source 211 on the basis of the setting information from the automatic recording setting unit 252. Specifically, the above-described automatic recording is started for an input source 211 for which the automatic recording has been set to ON. Furthermore, for an input source 211 for which the automatic recording has been set to OFF, the automatic recording is not started, and the input source 211 is brought into a standby state for manual recording (recording instruction from the surgical staff member). The input source 211 for which the automatic recording has been set to OFF may allow continuous recording rather than be brought into a standby state for manual recording.

The image from each input source 211 is recorded in the surgical operation room server 107 (recording unit 231) connected to each input source 211 via the IP converter 115. This allows large volume recording.

Alternatively, the image from each input source 211 may be recorded in a corresponding IP converter 115 connected to the input source 211. Therefore, even in a case where any system failure occurs in the surgical operation room system 100, recording can be continued as long as each IP converter 115 is in operation. In this case, the automatic recording setting unit 252 sets the automatic recording to ON/OFF for each IP converter 115 associated with a corresponding input source 211.

<3. Automatic Recording Setting Processing>

(Example of Setting Screen)

Figure 3:
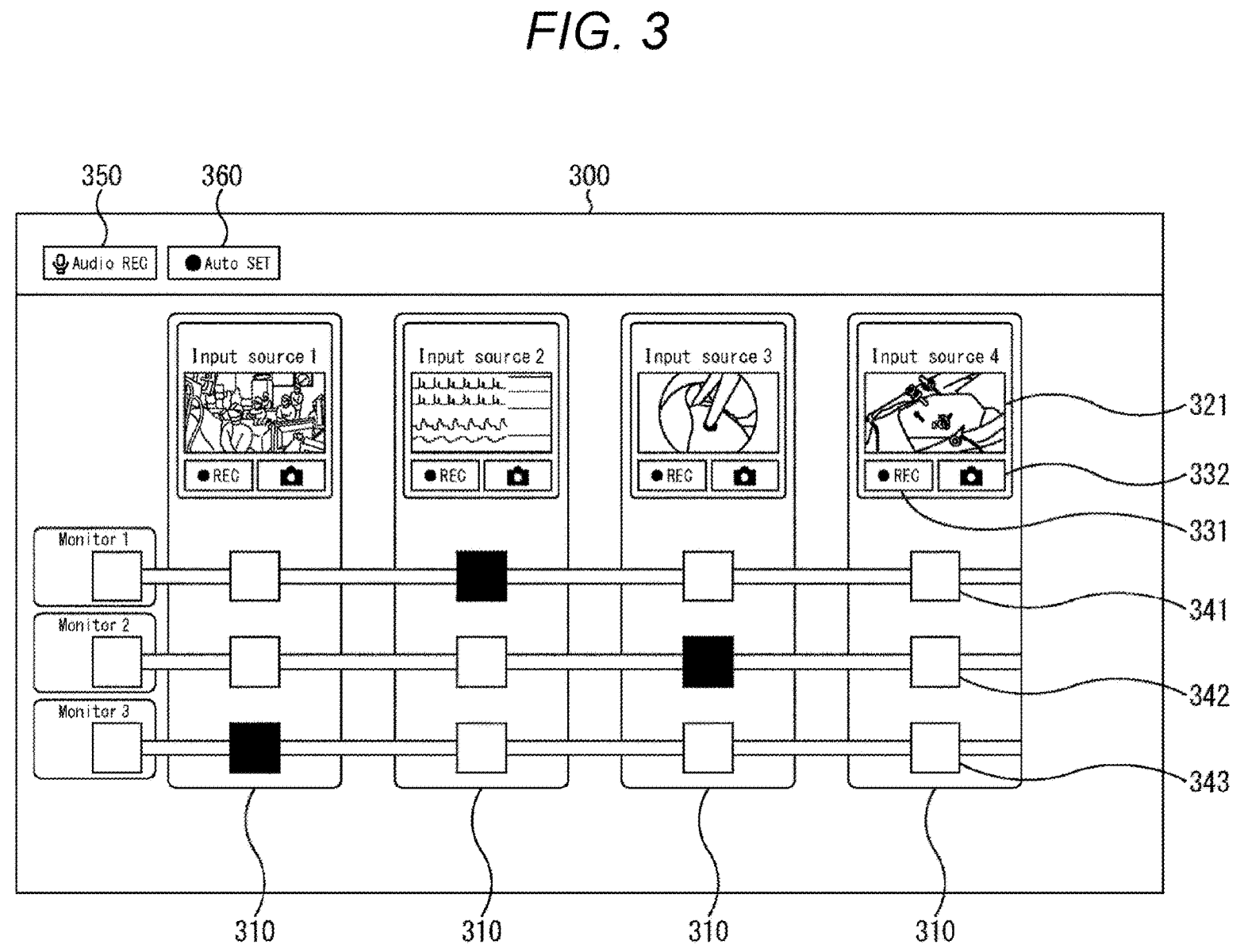

FIG. 3 is a diagram depicting an example of the setting screen that is operated by the surgical staff member to receive the setting of ON/OFF of the automatic recording.

The setting screen 300 in FIG. 3 is displayed on the centralized operation panel 111, for example.

The setting screen 300 is provided with a setting field 310 for receiving a setting of image display and a setting of image recording for each input source 211. In the example in FIG. 3, four setting fields 310 corresponding to four input sources 211 are depicted.

An image display section 321, a recording button 322, and a shutter button 323 are provided in an upper part of the setting field 310. The image display section 321 is a field where an image input from the input source 211 is displayed in real time. The recording button 322 is a button to be operated to start or stop recording of the image (moving image) displayed on the image display section 321. The shutter button 323 is a button to be operated to record the image displayed in the image display section 321 as a still image.

Switch buttons 341, 342, 343 for switching monitors as an output destination of the image displayed in the image display section 321 is provided in a lower part of the setting field 310. Three monitors 1, 2, and 3 are associated with the switch buttons 341, 342, 343, respectively, and, for example, when the switch button 341 is selected, the image displayed in the image display section 321 is output to the monitor 1. The number of switch buttons can be changed according to the number of monitors provided in the surgical operation room system 100.

In an upper left part of the setting screen 300, a sound recording button 350 and an automatic recording setting button 360 are provided. The sound recording button 350 is a button to be operated to start or stop recording of sounds in the surgical operation room. The automatic recording setting button 360 is a button to be operated to set the surgical operation room system 100 into an automatic recording setting mode for setting the automatic recording to ON/OFF for each input source 211.

For example, although not illustrated, when the surgical operation room system 100 is set into the automatic recording setting mode, each setting field 310 has a setting button for setting the automatic recording to ON/OFF for a corresponding input source 211 displayed in a predetermined field. The user (surgical staff member) can operate the setting button in each setting field 310 to set the automatic recording to ON/OFF for a corresponding input source 211.

(Flow of Automatic Recording Setting Processing 1)

Here, a flow of automatic recording setting processing of setting the automatic recording to ON/OFF for each input source 211 will be described with reference to the flowchart in FIG. 4. The processing in FIG. 4 is performed for each input source 211 with the surgical operation room system 100 set into the automatic recording setting mode.

In step S11, the setting receiving unit 251 determines whether or not the setting of the automatic recording for the input source 211 corresponding to the setting field 310 has been received according to whether or not the setting button displayed in the setting field 310 has been operated.

In a case where it is determined in step S11 that the setting of the automatic recording has been received, the processing proceeds to step S12, and the automatic recording setting unit 252 sets the automatic recording to ON for the input source 211 corresponding to the setting field 310 in which the setting button has been operated.

On the other hand, in a case where it is determined in step S11 that the setting of the automatic recording has not been received, the processing proceeds to step S13, and the automatic recording setting unit 252 sets the automatic recording to OFF for the input source 211 corresponding to the setting field 310 in which the setting button has been operated.

As described above, whether or not to enable the automatic image recording can be set for each of the plurality of input sources 211.

In the processing in FIG. 4, whether or not to enable the automatic recording for each input source 211 is individually set in response to the operation of the setting button displayed in the setting field 310. Alternatively, whether or not to enable the automatic recording for each input source 211 may be collectively (automatically) set.

(Flow of Automatic Recording Setting Processing 2)

An example of automatic recording setting processing of collectively setting the automatic recording to ON/OFF for each input source 211 will be described with reference to the flowchart in FIG. 5. The processing in FIG. 5 is started when the surgical operation room system 100 is set into the automatic recording setting mode in response to the operation of the automatic recording setting button 360.

In step S31, the setting receiving unit 251 receives the setting of the automatic recording for each input source 211 when the surgical operation room system 100 is set into the automatic recording setting mode.

In step S32, the automatic recording setting unit 252 determines whether or not one of the plurality of input sources 211 is an input source for which the automatic recording is enabled.

Specifically, the automatic recording setting unit 252 determines whether or not it is an input source for which the automatic recording is enabled on the basis of the type of the input source 211. For example, the automatic recording setting unit 252 acquires medical instrument information of the input source 211, and determines whether or not it is an input source for which the automatic recording is enabled in accordance with a table set in advance on the basis of the types of the electronic medical instruments. For example, the medical instrument information may be acquired from the metadata of the image from the input source 211, or may be acquired as digital imaging and communications in medicine (DICOM) information. Furthermore, the medical instrument information may be connection information acquired by the IP converter 115 connected to the input source 211.

Furthermore, the automatic recording setting unit 252 may determine whether or not it is an input source for which the automatic recording is enabled on the basis of preset information in which ON/OFF of the automatic recording is preset. For example, the preset information is information in which the automatic recording is set to ON/OFF for each IP converter 115 to which the input source 211 is connected. That is, the automatic recording is set to ON/OFF for the input source 211 according to the IP converter 115 to which the input source 211 is connected. Furthermore, a plurality of pieces of the preset information may be stored in the surgical operation room server 107, and the automatic recording may be set to ON/OFF for each input source 211 on the basis of the preset information selected by the user (surgical staff member).

The preset information may be associated with a surgical procedure or may be information set by the user. Moreover, recommended preset information may be presented to the user in response to recognition of the type of each individual electronic medical instrument.

Meanwhile, in step S32, in a case where it is determined that the input source 211 is an input source for which the automatic recording is enabled on the basis of the type of the input source 211 or the preset information, the processing proceeds to step S33. In step S33, the automatic recording setting unit 252 sets the automatic recording to ON for the input source 211.

On the other hand, in a case where it is determined in step S32 that the input source 211 is not an input source for which the automatic recording is enabled on the basis of the type of the input source 211 or the preset information, the processing proceeds to step S34. In step S34, the automatic recording setting unit 252 sets the automatic recording to OFF for the input source 211.

After step S33 or step S34, the processing proceeds to step S35, and the automatic recording setting unit 252 determines whether or not the automatic recording has been set to ON/OFF for all the input sources 211.

In a case where it is determined that the automatic recording has not been set to ON/OFF for all the input sources 211, the processing returns to step S32, and the subsequent processing is repeated. On the other hand, in a case where it is determined that the automatic recording has been set to ON/OFF for all the input sources 211, the series of processing is brought to an end.

As described above, whether or not to enable the automatic image recording for each of the plurality of input sources 211 can be collectively set.

In the processing described above, since whether or not to enable the automatic image recording is set for each of the plurality of input sources, it is possible to keep, in an appropriate manner, surgical records for each input source. Specifically, a desired surgical image can be recorded without recording surgical images from the beginning to the end. It is therefore possible to reduce a recording volume per surgery without missing a record of an unexpected event such as bleeding.

(Flow of Automatic Recording Setting Processing 3)

Meanwhile, in the surgical operation room system 100, there is a case where it is preferable that when the automatic recording is started for one input source 211, the automatic recording be started simultaneously for an associated input source 211.

With reference to the flowchart in FIG. 6, a flow of automatic recording setting processing of setting the automatic recording to ON/OFF such that when automatic recording is started for one input source 211, the automatic recording is started simultaneously for the associated input source 211 will be described. The processing in FIG. 6 is performed, in a manner similar to the processing in FIG. 4, for each input source 211 with the surgical operation room system 100 set into the automatic recording setting mode.

In step S51, the setting receiving unit 251 determines whether or not the setting of the automatic recording for the input source 211 corresponding to the setting field 310 has been received according to whether or not the setting button displayed in the setting field 310 has been operated.

In a case where it is determined in step S51 that the setting of the automatic recording has been received, the processing proceeds to step S52, and the automatic recording setting unit 252 sets the automatic recording to ON for the input source 211 corresponding to the setting field 310 in which the setting button has been operated.

In step S53, the setting receiving unit 251 determines whether or not a setting or selection of an input source for starting the automatic recording simultaneously with the input source 211 for which the automatic recording has been set to ON has been received according to whether or not a GUI (not illustrated) displayed on the setting screen 300 has been operated, for example.

Here, the input source of which the setting/selection for simultaneously starting the automatic recording is received may be limited to the input source 211 for which the automatic recording has been set to ON, or may include the input source 211 for which the automatic recording has been set to OFF.

In a case where it is determined in step S53 that the setting/selection of the input source for simultaneously starting the automatic recording has been received, the processing proceeds to step S54. In step S54, the automatic recording setting unit 252 sets the automatic recording to ON for the input source 211 of which the setting or selection for simultaneously starting the automatic recording has been received.

Note that, in a case where it is determined in step S53 that the setting/selection of the input source for simultaneously starting the automatic recording has not been received, step S54 is skipped.

On the other hand, in a case where it is determined in step S51 that the setting of the automatic recording has not been received, the processing proceeds to step S55, and the automatic recording setting unit 252 sets the automatic recording to OFF for the input source 211 corresponding to the setting field 310 in which the setting button has been operated.

As described above, the automatic recording can be set to ON/OFF such that when the automatic recording is started for one input source 211, the automatic recording is started simultaneously for the associated input source 211.

In the processing described above, for example, when the pre-recording is started for the endoscope by a predetermined trigger, the pre-recording is started simultaneously for another associated input source. Therefore, when an unexpected event such as bleeding occurs, an image from another input source before the event occurs can be recorded simultaneously with an image from the endoscope before the event occurs.

<4. Recording Processing for Each Input Source>

Hereinafter, a flow of recording processing for each input source 211 for which the automatic recording has been set to ON/OFF by the above-described automatic recording setting processing will be described.

(Flow of Recording Processing for Each Input Source 1)

Figure 7:
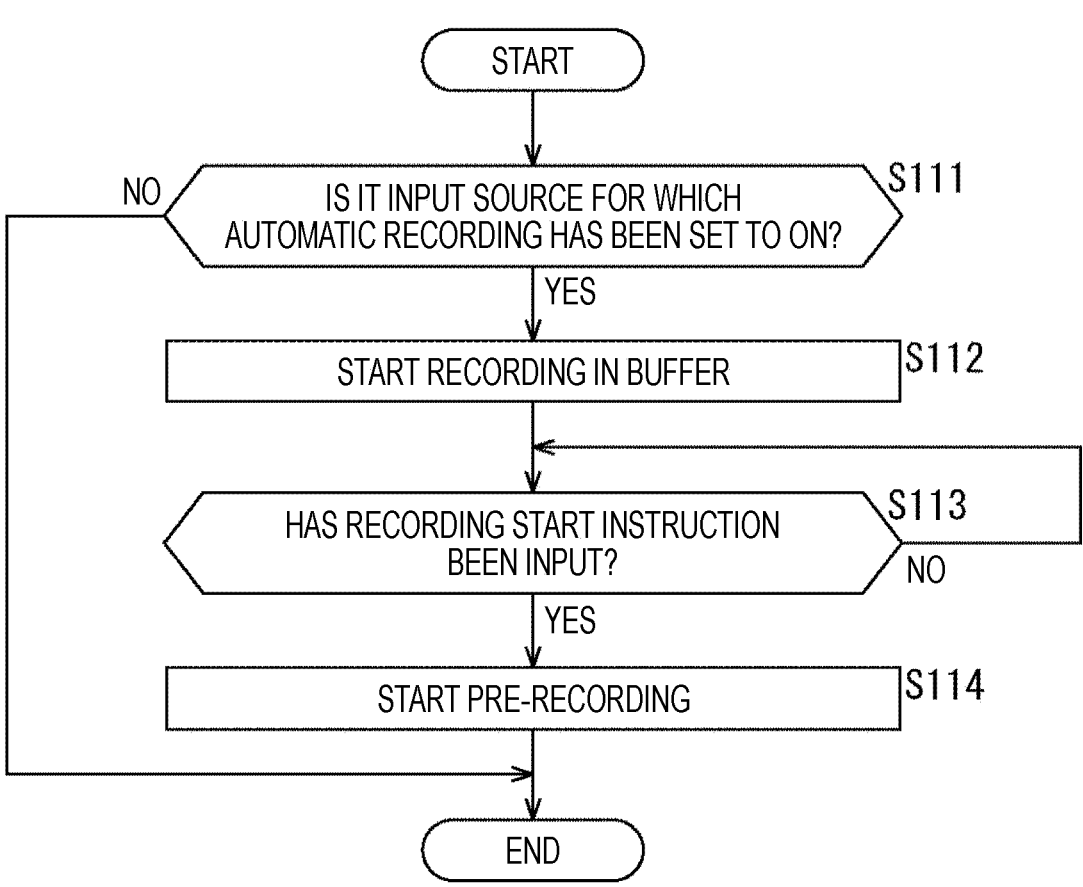
FIG. 7 is a flowchart for describing a flow of recording processing for each input source.

A flow of recording processing for each input source 211 in a case where the automatic recording is the pre-recording will be described with reference to the flowchart in FIG. 7. The processing in FIG. 7 is performed for each input source 211 for which the automatic recording has been set to ON/OFF.

In step S111, the recording control unit 253 determines whether or not it is an input source for which the automatic recording has been set to ON on the basis of, for example, the setting information showing ON/OFF of the automatic recording for each input source 211 set by the automatic recording setting unit 252.

In a case where it is determined in step S111 that it is an input source for which the automatic recording has been set to ON, the processing proceeds to step S112, and the recording control unit 253 starts to record the image from the input source 211 in a buffer. As a result, for example, frames for 30 seconds from the input source 211 are recorded without interruption in a read only memory (ROM) included in the surgical operation room server 107 or a buffer area of the recording unit 231. In this buffer area, the frames for 30 seconds may be recorded without interruption by repeating recording and deletion in units of frames, or a group of frames to be recorded may be switched every 30 seconds.

In step S113, the recording control unit 253 determines whether or not the recording start instruction has been input for the input source 211. Step S113 is repeated until the recording start instruction is input.

The recording start instruction here may be triggered by operation such as pressing of a button by the user or arrival of temporal timing preset by the user. Furthermore, the recording start instruction may be triggered by the recognition result of image recognition performed on the image from the input source 211, or may be triggered by the input from the electronic medical instrument. For example, recognition of insertion of the endoscope into the body of the patient by image recognition may be used as the recording start instruction, or detection of power ON of an electric scalpel may be used as the recording start instruction. Moreover, the recording start instruction may be triggered by a user's spoken voice.

In a case where it is determined in step S113 that the recording start instruction has been input for the input source 211, the recording control unit 253 starts the pre-recording of the image from the input source 211 in step S114. This allows recording of the image from the input source 211 from, for example, 30 seconds before the recording start instruction.

On the other hand, in a case where it is determined in step S111 that it is not an input source for which the automatic recording has been set to ON, the processing is brought to an end. That is, since the input source 211 is an input source for which the automatic recording has been set to OFF, the input source 211 is brought into a standby state for manual recording, for example.

Details of the pre-recording may be set by the automatic recording setting unit 252 according to a user operation on the setting screen 300 or the like. Specifically, a frame rate of an image to be recorded in the buffer and a buffer recording time (such as 30 seconds described above) may be set according to the image quality (resolution) of the image from the input source 211. For example, as the buffer recording time, seconds is set in a case where the image from the input source 211 is a 4K image, and 60 seconds is set in a case where the image from the input source 211 is an HD image. Furthermore, which of the frame rate and the buffer recording time is emphasized for recording of frames in the buffer may be set according to a user operation.

Furthermore, the buffer recording time may be changed between a case where the image from each input source 211 is recorded in the surgical operation room server 107 (recording unit 231) and a case where the image is stored in each corresponding IP converter 115. For example, in a case where the image from the input source 211 is recorded in a corresponding IP converter 115, the buffer recording time may be set to 30 seconds; on the other hand, in a case where the image is recorded in the surgical operation room server 107 (recording unit 231) capable of large volume recording, the buffer recording time may be set to 60 seconds.

(Flow of Recording Processing for Each Input Source 2)

Figure 8:
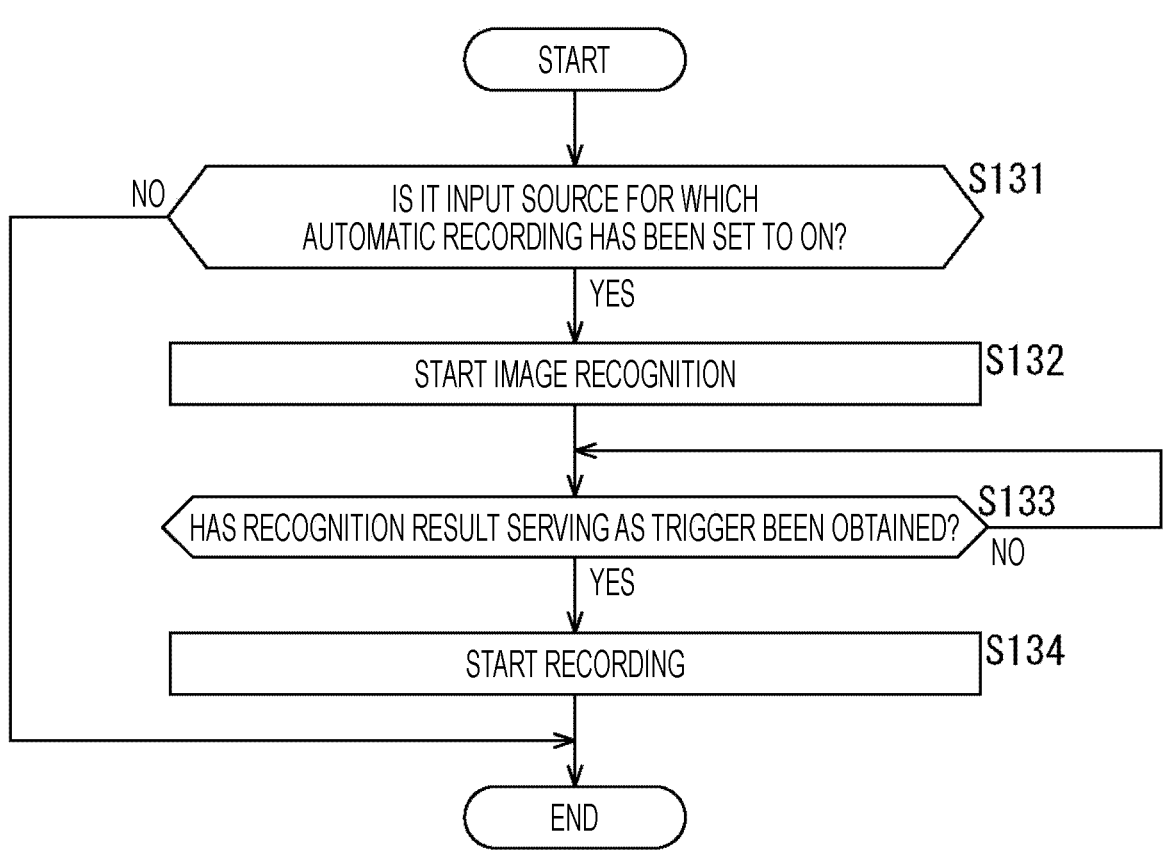
FIG. 8 is a flowchart for describing a flow of the recording processing for each input source.

A flow of recording processing for each input source 211 in a case where the automatic recording is the trigger recording in which recording starts with the recognition result of image recognition as a trigger will be described with reference to a flowchart in FIG. 8. The processing in FIG. 8 is also performed for each input source 211 for which the automatic recording has been set to ON/OFF.

In step S131, the recording control unit 253 determines whether or not it is an input source for which the automatic recording has been set to ON on the basis of, for example, the setting information showing ON/OFF of the automatic recording for each input source 211 set by the automatic recording setting unit 252.

In a case where it is determined in step S131 that it is an input source for which the automatic recording has been set to ON, the processing proceeds to step S132, and the recording control unit 253 starts to perform image recognition on the image from the input source 211.

In step S133, the recording control unit 253 determines whether or not the recognition result serving as a trigger for the start of recording has been obtained for the input source 211. Step S133 is repeated until the recognition result serving as a trigger for the start of recording is obtained.

For example, in a case where the input source 211 is the endoscope, the recognition result serving as a trigger for the start of recording may be insertion of the endoscope into the body of the patient, entry of the surgical staff member into the surgical operation room, or a specific operation made by the surgical staff member. Such image recognition is performed by, for example, a machine learning model using a neural network.

In a case where it is determined in step S133 that the recognition result serving as a trigger for the start of recording has been obtained for the input source 211, the recording control unit 253 starts to record the image from the input source 211 in step S134.

On the other hand, in a case where it is determined in step S131 that it is not an input source for which the automatic recording has been set to ON, the processing is brought to an end. That is, since the input source 211 is an input source for which the automatic recording has been set to OFF, the input source 211 is brought into a standby state for manual recording, for example.

(Flow of Recording Processing for Each Input Source 3)

Figure 9:
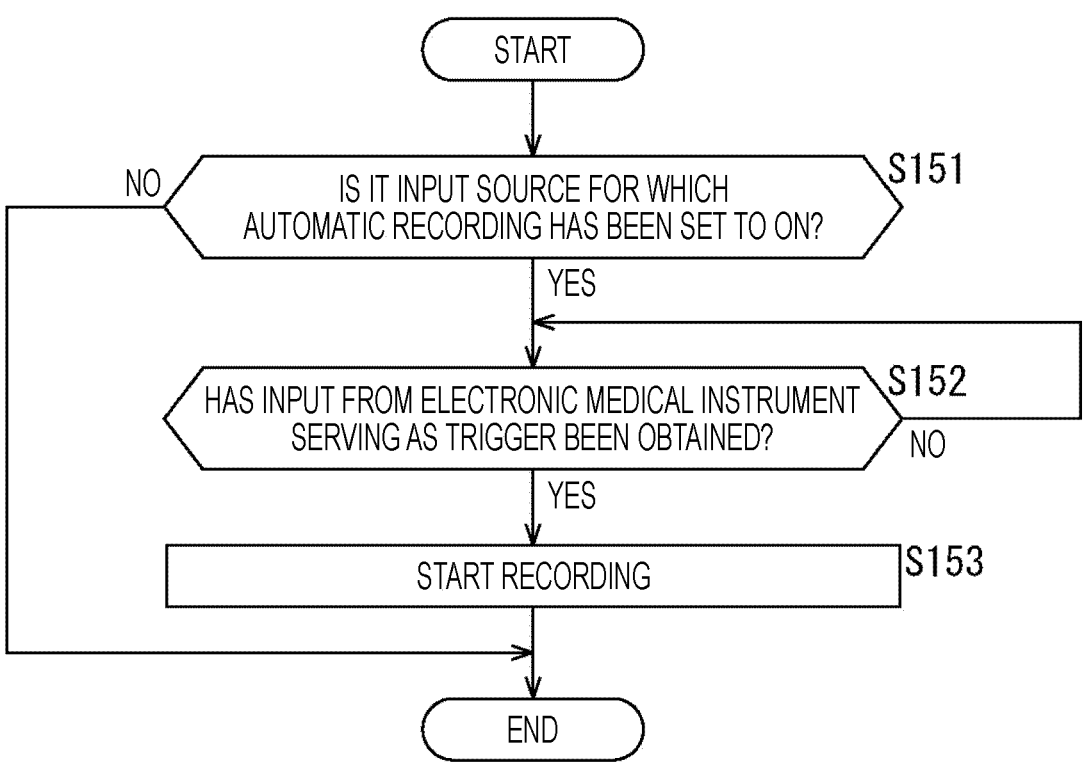
FIG. 9 is a flowchart for describing a flow of the recording processing for each input source.

A flow of recording processing for each input source 211 in a case where the automatic recording is the trigger recording that is triggered by input from the electronic medical instrument will be described with reference to a flowchart in FIG. 9. The processing in FIG. 9 is also performed for each input source 211 for which the automatic recording has been set to ON/OFF.

In step S151, the recording control unit 253 determines whether or not it is an input source for which the automatic recording has been set to ON on the basis of, for example, the setting information showing ON/OFF of the automatic recording for each input source 211 set by the automatic recording setting unit 252.

In a case where it is determined in step S151 that it is an input source for which the automatic recording has been set to ON, the processing proceeds to step S152, and the recording control unit 253 determines whether or not the input from the electronic medical instrument serving as a trigger for the start of recording has been obtained for the input source 211. Step S152 is repeated until the input from the electronic medical instrument serving as a trigger for the start of recording is obtained.

The input from the electronic medical instrument serving as a trigger for the start of recording includes, for example, power ON/OFF of the electric scalpel, opening or closing of a door to the surgical operation room (entry of the surgical staff member), wireless communication by RFID from the electronic medical instrument, or the like.

In a case where it is determined in step S152 that the input from the electronic medical instrument serving as a trigger for the start of recording has been obtained for the input source 211, the recording control unit 253 starts to record the image from the input source 211 in step S153.

On the other hand, in a case where it is determined in step S151 that it is not the input source for which the automatic recording has been set to ON, the processing is brought to an end. That is, since the input source 211 is an input source for which the automatic recording has been set to OFF, the input source 211 is brought into a standby state for manual recording, for example.

<5. Other Automatic Recording Functions>

For the input source 211 for which the automatic recording has been set to ON, the pre-recording may be started in response to an instruction given over the network from another site located outside the surgical operation room as the recording start instruction. For example, even for the input source 211 for which the automatic recording has been set to ON, in a case where an unexpected event occurs, the surgical staff member is busy with dealing with the event and may not be able to press the button for the start of recording within 30 seconds. Therefore, a staff member in a surgery monitor room located outside the surgical operation room may be able to input the recording start instruction when the staff member notices that an unexpected event has occurred.

In the surgical operation room system 100, whether or not to enable the automatic image recording for each input source 211 may be set by the automatic recording setting unit 252 according to the use of the image to be recorded. For example, the image from the surgical field camera 189 is recorded without interruption for evidence of a trial when a medical accident occurs, and the automatic image recording is set to ON for another input source 211 for report creation, explanation to the patient, and procedure propagation, so that each image can be recorded with an optimum recording volume.

In this case, a black-box function that prevents any person other than an administrator from editing an image recorded for evidence of a trial may be applied to the image. For example, when a surgery start button that is displayed on the centralized operation panel 111 and is operated at the start of surgery is pressed, image recording based on the black box function is started.

Figure 10:
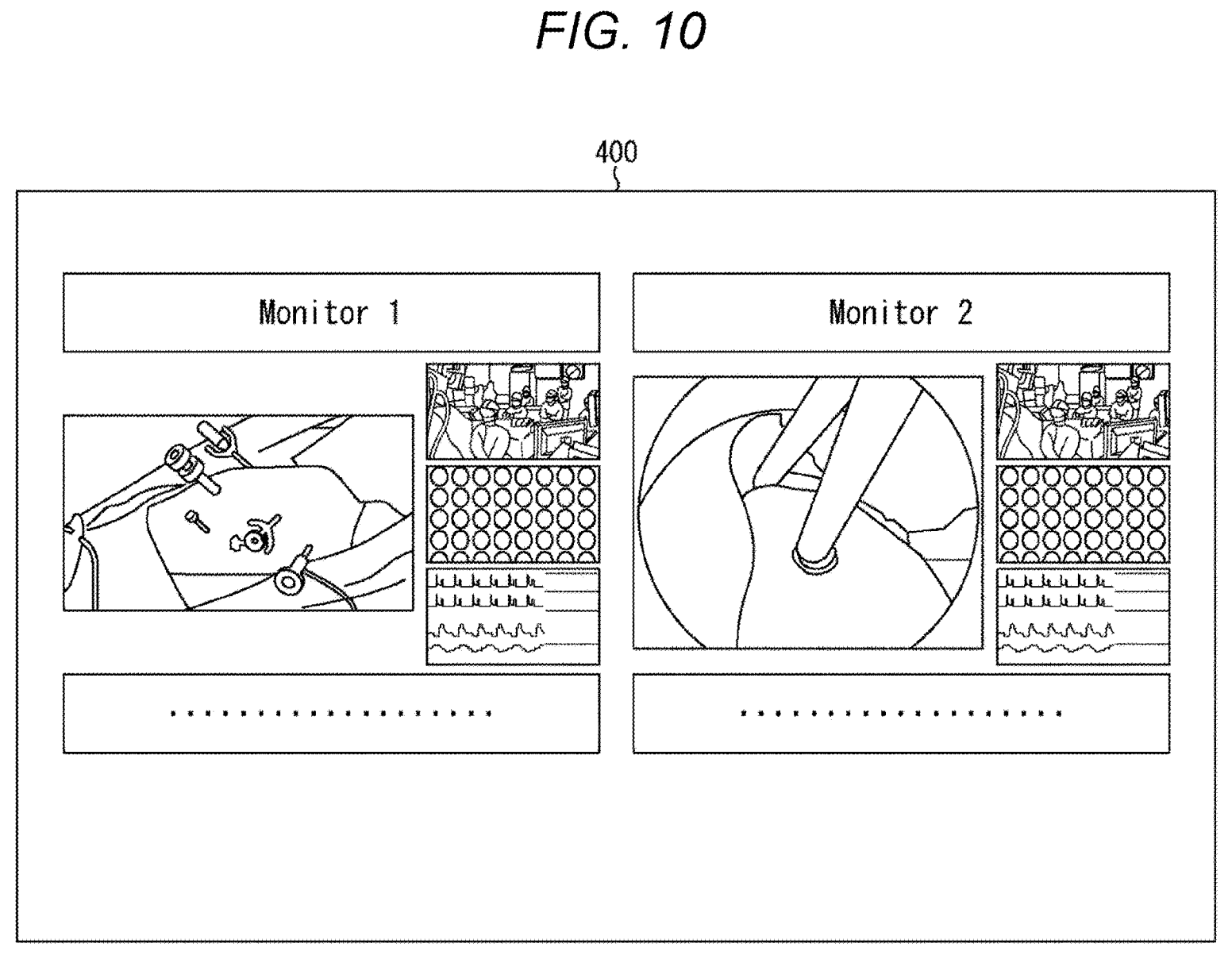

As depicted in FIG. 10, an integration screen in which the images from the plurality of input sources 211 in the surgical operation room system 100 are integrated can be displayed on the centralized operation panel 111.

When the automatic recording of the image displayed on the integration screen as depicted in FIG. 10 is set, whether to enable the automatic recording of the entire integration screen or to enable the automatic recording of each image from each input source 211 displayed on the integration screen may be set. In a case where the automatic recording of each image from each input source 211 is set, the surgical operation room system 100 acquires information regarding each input source 211 that has input the image displayed on the integration screen, determines for which input source 211 the automatic recording is set to ON on the basis of the information, and starts the automatic recording.

Note that the integration screen as depicted in FIG. 10 may be displayed in the surgery monitor room located outside the surgical operation room as described above.

6. Modification Example (Preview Screen)

Figure 11:
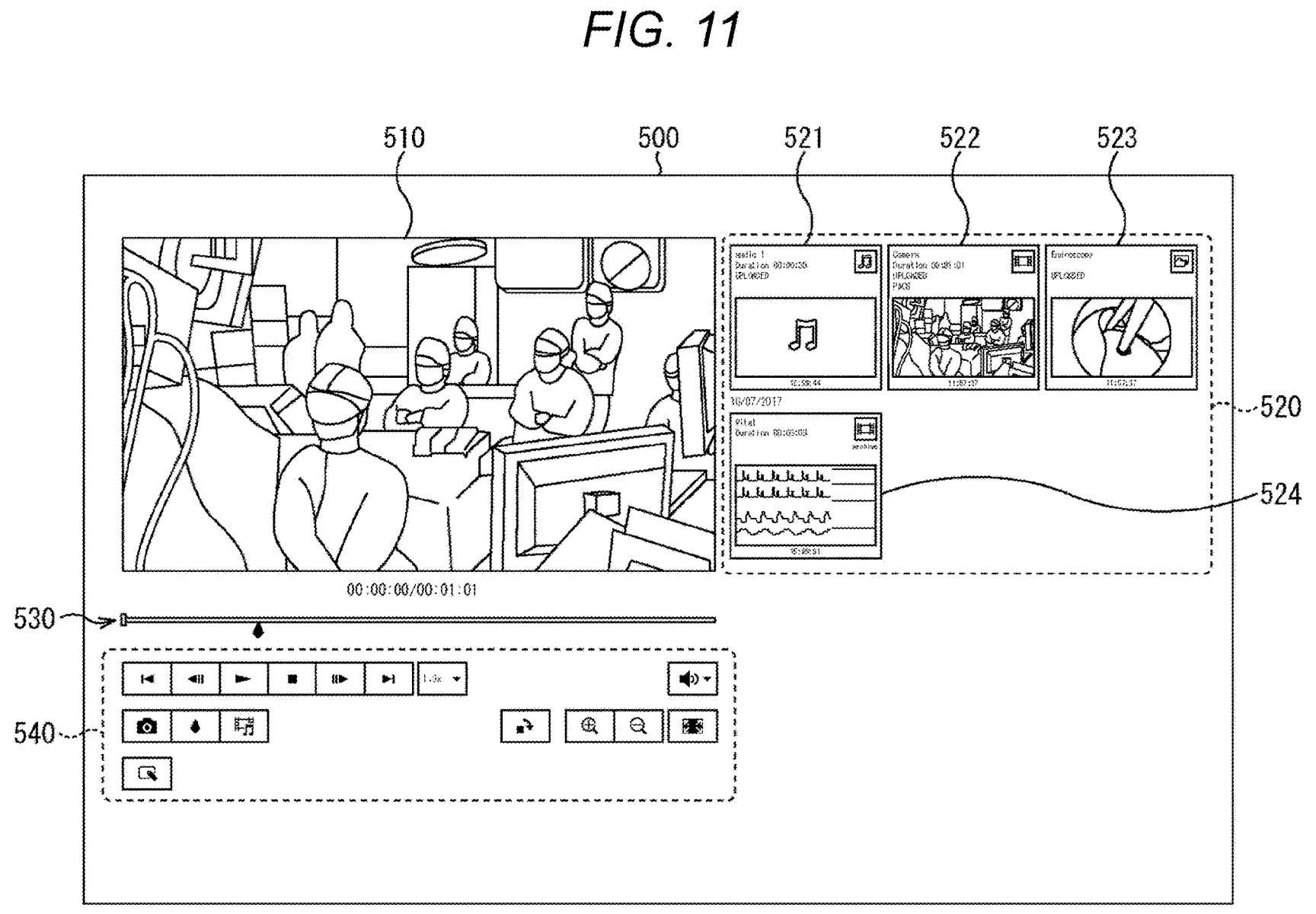

The image from each input source 211 recorded in the surgical operation room system 100 described above can also be reproduced after surgery or the like on a preview screen 500 as depicted in FIG. 11.

The preview screen 500 is provided with a reproduction field 510, a reproduction target selection field 520, a timeline 530, and an operation button group 540.

The reproduction field 510 is a field where an image or a sound selected in the reproduction target selection field 520 is reproduced. In the example in FIG. 11, selection buttons 521 to 524 including thumbnails and icons indicating images and sounds recorded in the surgical operation room system 100 are displayed in the reproduction target selection field 520.

The selection button 521 corresponds to a sound recorded in the surgical operation room system 100. On the selection button 521, in addition to the icon indicating a sound, a reproduction time and a recording start time of the sound are displayed.

The selection button 522 corresponds to an image captured by the surgical field camera 189 and recorded in the surgical operation room system 100. In addition to the thumbnail of the image, a reproduction time and a recording start time of the image are displayed on the selection button 522. In the example in FIG. 11, when the selection button 522 is selected, and the image of how the entire surgical operation room is captured by the surgical field camera 189 is reproduced in the reproduction field 510.

The selection button 523 corresponds to a still image captured by the endoscope that is one of the devices belonging to the device group 101 and recorded in the surgical operation room system 100. In addition to the thumbnail of the still image, a recording time (imaging time) of the still image is displayed on the selection button 523.

The selection button 524 corresponds to vital signs of the patient under surgery recorded in the surgical operation room system 100. In addition to the thumbnail of the vital signs, a recording start time of the vital signs is displayed on the selection button 524.

The timeline 530 provided below the reproduction field 510 indicating a total reproduction time of the image or sound in reproduction in the reproduction field 510, and a pointer is displayed at a portion corresponding to a reproduction position.

The operation button group 540 includes buttons for receiving various operations on the image or sound in reproduction in the reproduction field 510, such as stop and pause of reproduction, fast forward and fast backward, double speed reproduction, and mute of sound, image enlargement and reduction, and still image capturing.

On such a preview screen 500, it is also possible to select an image recorded under the automatic recording in the reproduction target selection field 520.

In this case, in the selection button displayed in the reproduction target selection field 520, for example, a still image captured at the timing when the recording start instruction (operation such as pressing of a button) for the pre-recording is input is displayed as a thumbnail. This allows, for example, a surgeon to select an image to be reproduced on the basis of his/her memory, for example, "such an image should have been recorded".

Furthermore, in this case, the timeline 530 may be displayed in a manner as to allow an image section recorded in the buffer, for example, for 30 seconds and an image section recorded in response to the input of the recording start instruction under the pre-recording to be distinguished from each other. This allows the surgeon to grasp at a glance the timing at which the surgeon started recording.

Note that an image recorded under the automatic recording may include an image not stored in the user's memory. It is therefore preferable that the thumbnail on the selection button displayed in the reproduction target selection field 520 be displayed so as to allow an image recorded under the automatic recording and an image recorded under the manual recording to be distinguished from each other.

(Others)

With the automatic recording described above, the recording volume per surgery can be reduced. Moreover, a predetermined threshold may be set for the recording volume under the automatic recording, and in a case where the recording volume exceeds the threshold, image recording under the automatic recording may be stopped. It is therefore possible to record an image with an appropriate recording volume according to the capacity of the recording unit 231 and the like.

Furthermore, an importance level may be assigned to an image recorded under the automatic recording, and an image having a lower importance level may be deleted first. For example, the lower the importance level of an image, the shorter a retention period of the image, and the image may be deleted when the retention period is expired, or deletion timing may be set every predetermined number of days, and the image having a lower importance level may be deleted at each deletion timing.

In the embodiment described above, the image as the output result of the medical imaging device is subjected to IP conversion using the external IP converter, but a function of performing IP conversion may be implemented in the medical imaging device.

An example where the plurality of input sources is provided in one surgical operation room has been described above, but the plurality of input sources may be provided in a plurality of surgical operation rooms. Furthermore, the plurality of input sources may be provided in an ICU, a ward, a nursing care facility, or the like rather than in a surgical operation room. In this case, the input source is, for example, a video source that outputs information regarding the patient. This allows patient records and nursing care records to be kept in an appropriate manner.

<7. Configuration Example of Computer>

The series of processing described above can be performed by hardware or software. In a case where the series of processing is performed by software, a program constituting the software is installed from a program recording medium to a computer incorporated in dedicated hardware, a general-purpose personal computer, or the like.

Figure 12:
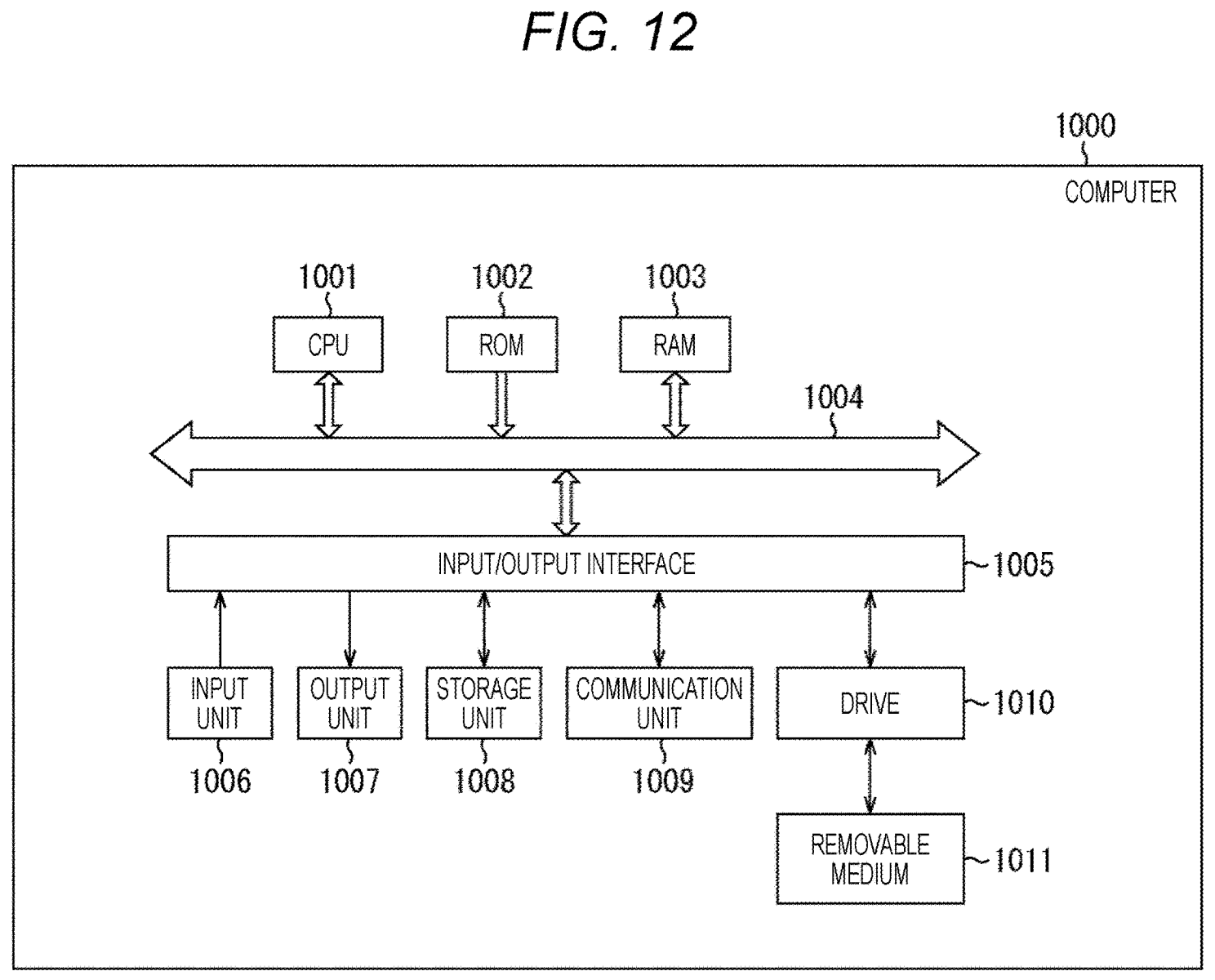

FIG. 12 is a block diagram depicting a configuration example of hardware of a computer that performs the series of processing described above in accordance with a program.

The surgical operation room server 107 to which the technology according to the present disclosure can be applied is implemented by the computer having the configuration depicted in FIG. 12.

A CPU 1001, a read only memory (ROM) 1002, and a random access memory (RAM) 1003 are mutually connected over a bus 1004.

An input/output interface 1005 is further connected to the bus 1004. An input unit 1006 including a keyboard, a mouse, and the like, and an output unit 1007 including a display, a speaker, and the like are connected to the input/output interface 1005. Furthermore, the input/output interface 1005 is connected to a storage unit 1008 including a hard disk, a non-volatile memory, or the like, a communication unit 1009 including a network interface or the like, and a drive 1010 that drives a removable medium 1011.

In the computer configured as described above, for example, the CPU 1001 loads a program stored in the storage unit 1008 into the RAM 1003 via the input/output interface 1005 and the bus 1004 and executes the program to perform the above-described series of processing.

For example, the program to be executed by the CPU 1001 is recorded in the removable medium 1011 or provided via a wired or wireless transmission medium such as a local area network, the Internet, or a digital broadcast, and installed in the storage unit 1008.

Note that the program to be executed by the computer may be a program in which processing is performed in time series in the order described herein, or may be a program in which processing is performed in parallel or at necessary timing such as when a call is made, and the like.

Note that the embodiment of the present disclosure is not limited to the above-described embodiment, and various modifications can be made without departing from the gist of the present disclosure.

Furthermore, the effects described herein are merely examples and are not limited, and other effects may be provided.

Moreover, the present disclosure may have the following configurations.

(1)

A surgical operation room system including a setting unit configured to set whether or not to enable, for each of a plurality of input sources that inputs an image, automatic recording of the image, the plurality of input sources being provided in a surgical operation room.

(2)

The surgical operation room system described in (1), in which the automatic recording includes pre-recording in which recording of the image starts from a predetermined time before a recording start instruction.

(3)

The surgical operation room system described in (2), in which the recording start instruction is triggered by at least one of a user operation or setting, a recognition result of image recognition performed on the image, or input from an electronic medical instrument.

(4)

The surgical operation room system described in (2), in which the recording start instruction is an instruction from outside of the surgical operation room.

(5)

The surgical operation room system described in (2), in which the setting unit further sets the predetermined time.

(6)

The surgical operation room system described in (2) or (3), in which the setting unit further sets a frame rate of the image to be recorded.

(7)

The surgical operation room system described in (1), in which the automatic recording includes trigger recording in which recording starts with a recognition result of image recognition performed on the image as a trigger.

(8)

The surgical operation room system described in (7), in which the image recognition is performed by a machine learning model.

(9)

The surgical operation room system described in (1), in which the automatic recording includes trigger recording in which recording starts with input from an electronic medical instrument as a trigger.

(10)

The surgical operation room system described in (9), in which the input from the electronic medical instrument includes at least one of power ON/OFF, opening or closing of a door to the surgical operation room, or wireless communication by radio frequency identifier (RFID).

(11)

The surgical operation room system described in any one of (1) to (10), further including an Internet protocol (IP) converter connected to each of the input sources, in which each of the IP converters records the image for a corresponding one of the input sources.

(12)

The surgical operation room system described in any one of (1) to (10), further including a server connected to each of the input sources via an Internet protocol (IP) converter, in which the server records the image for each of the input sources.

(13)

The surgical operation room system described in any one of (1) to (12), in which the setting unit sets whether or not to enable the automatic recording of the image for each of the input sources on the basis of a type of the input source.

(14)

The surgical operation room system described in any one of (1) to (12), in which the setting unit sets whether or not to enable the automatic recording of the image for each of the input sources on the basis of preset information.

(15)

The surgical operation room system described in any one of (1) to (12), in which the setting unit sets another one of the input sources for which the automatic recording starts simultaneously when the automatic recording for one of the input sources starts.

(16)

The surgical operation room system described in (1), in which the setting unit sets whether or not to enable the automatic recording of the image for each of the input sources according to use of the image to be recorded.

(17)

The surgical operation room system described in (1), further including a display unit configured to display an integration screen obtained by integrating a plurality of the images from the plurality of the input sources, in which the setting unit sets whether to enable the automatic recording of the integration screen or to enable the automatic recording of each of the images.

(18)
The surgical operation room system described in any one of (1) to (17), in which
the input sources include a medical imaging device.

(19)
An image recording method including
causing a surgical operation room system to set whether or not to enable, for each of a plurality of input sources that inputs an image, automatic recording of the image, the plurality of input sources being provided in a surgical operation room.

(20)
A program causing a computer to perform processing of setting whether or not to enable, for each of a plurality of input sources that inputs an image, automatic recording of the image, the plurality of input sources being provided in a surgical operation room.

(21)
A medical information processing system including
a setting unit configured to set whether or not to enable, for each of a plurality of video sources that outputs information regarding a patient, automatic recording of the information.

REFERENCE SIGNS LIST

100 Surgical operation room system
107 Surgical operation room server
109 IP switch
115 IP converter
211 Input source
231 Recording unit
251 Setting receiving unit
252 Automatic recording setting unit
253 Recording control unit

The invention claimed is:

1. A surgical operation room system, comprising:
circuitry configured to:
    set whether or not to enable, for each of a plurality of input sources that inputs an image, automatic recording of the image based on a type of the input source, the plurality of input sources being provided in a surgical operation room;
    set a trigger to start automatic recording for each of the types of the input source; and
    output a recording start instruction to that type of input source that is after a beginning of a surgery and in response to the trigger for that type of input source being received by the circuitry.

2. The surgical operation room system according to claim 1, wherein
the automatic recording includes pre-recording in which recording of the image starts from a predetermined time before a recording start instruction.

3. The surgical operation room system according to claim 2, wherein
the recording start instruction is triggered by at least one of a user operation or setting, a recognition result of image recognition performed on the image, or input from an electronic medical instrument.

4. The surgical operation room system according to claim 2, wherein
the recording start instruction is an instruction from outside of the surgical operation room.

5. The surgical operation room system according to claim 2, wherein
the circuitry is further configured to set the predetermined time.

6. The surgical operation room system according to claim 2, wherein
the circuitry is further configured to set further sets a frame rate of the image to be recorded.

7. The surgical operation room system according to claim 1, wherein
the automatic recording includes trigger recording in which recording starts with a recognition result of image recognition performed on the image as a trigger.

8. The surgical operation room system according to claim 7, wherein
the image recognition is performed by a machine learning model.

9. The surgical operation room system according to claim 1, wherein
the automatic recording includes trigger recording in which recording starts with input from an electronic medical instrument as a trigger.

10. The surgical operation room system according to claim 9, wherein
the input from the electronic medical instrument includes at least one of power ON/OFF, opening or closing of a door to the surgical operation room, or wireless communication by radio frequency identifier (RFID).

11. The surgical operation room system according to claim 1, further comprising
an Internet protocol (IP) converter connected to each of the input sources, wherein
each of the IP converters records the image for a corresponding one of the input sources.

12. The surgical operation room system according to claim 1, further comprising
a server connected to each of the input sources via an Internet protocol (IP) converter, wherein
the server records the image for each of the input sources.

13. The surgical operation room system according to claim 1,
wherein
the circuitry is configured to set whether or not to enable the automatic recording of the image for each of the input sources on a basis of preset information.

14. The surgical operation room system according to claim 1,
wherein
the circuitry is configured to set another one of the input sources for which the automatic recording starts simultaneously when the automatic recording for one of the input sources starts.

15. The surgical operation room system according to claim 1,
wherein
the circuitry is configured to set whether or not to enable the automatic recording of the image for each of the input sources according to use of the image to be recorded.

16. The surgical operation room system according to claim 1, further comprising
a display configured to display an integration screen obtained by integrating a plurality of the images from the plurality of the input sources, wherein
the circuitry is configured to set whether to enable the automatic recording of the integration screen or to enable the automatic recording of each of the images.

17. An image recording method, comprising:

causing a surgical operation room system to set whether or not to enable, for each of a plurality of input sources that inputs an image, automatic recording of the image based on a type of the input source, the plurality of input sources being provided in a surgical operation room;

setting a trigger to start automatic recording for each of the types of the input source; and outputting a recording start instruction to that type of input source that is after a beginning of a surgery and in response to the trigger for that type of input source being received.

18. A non-transitory computer readable storage device having a computer readable program causing a computer to set whether or not to enable, for each of a plurality of input sources that inputs an image, automatic recording of the image based on a type of the input source, the plurality of input sources being provided in a surgical operation room;

set a trigger to start automatic recording for each of the types of the input source; and output a recording start instruction to that type of input source that is after a beginning of a surgery and in response to the trigger for that type of input source being received by the circuitry.

\* \* \* \* \*